March 21, 1961 R. E. STILWELL 2,975,799
COMBINATION PIPE COUPLING AND AUTOMATIC DRAIN VALVE
Filed July 9, 1956
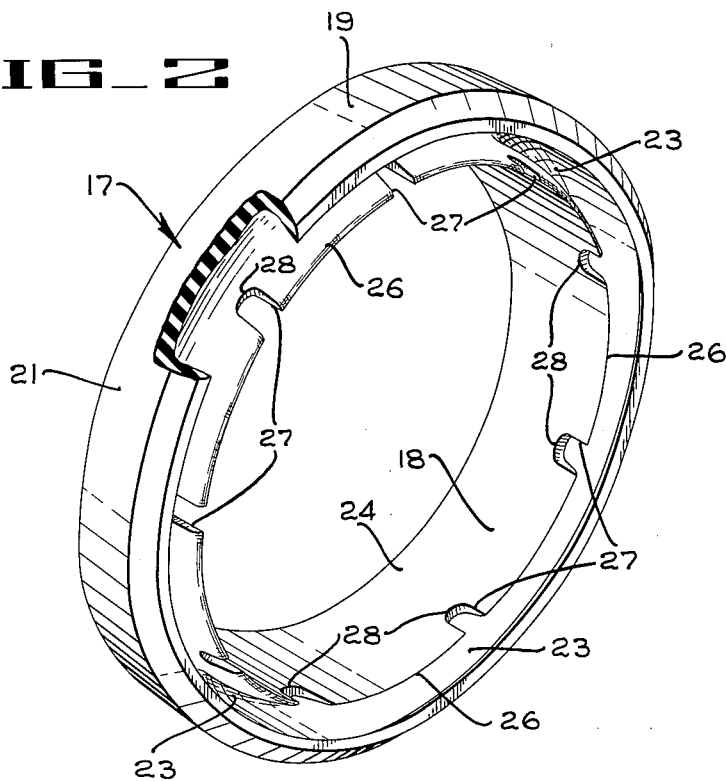
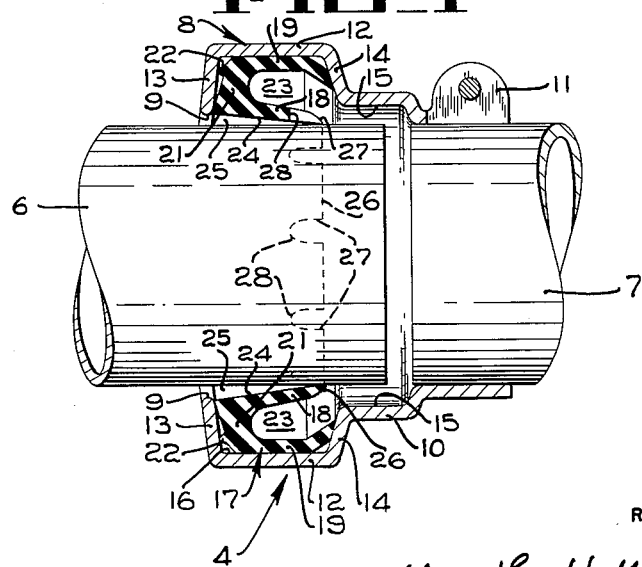
INVENTOR
ROBERT E. STILWELL
BY *Hans G. Hoffmeister*
ATTORNEY

United States Patent Office 2,975,799
Patented Mar. 21, 1961

2,975,799

COMBINATION PIPE COUPLING AND AUTOMATIC DRAIN VALVE

Robert E. Stilwell, Santa Clara, Calif., assignor to Food Machinery and Chemical Corporation, San Jose, Calif., a corporation of Delaware Filed July 9, 1956, Ser. No. 596,461

10 Claims. (Cl. 137—521)

This invention appertains to improvements in flexible pipe joints and more specifically to an improved combination pipe coupling and automatic drain valve for a pipeline of the type used in irrigation systems.

In portable irrigation systems, which are now in common use, sections of lightweight pipe are coupled together to form a pipeline. Sprinkler outlets are spaced along the pipeline at even intervals so that water, when pumped into the pipeline, will be forced out of the sprinkler heads to irrigate a strip of land parallel to the pipeline. In order to irrigate a second strip of land, each section of pipe making up the pipeline must be uncoupled and moved to the new location where the pipeline is again assembled.

When the ground over which this type of portable irrigation system is placed is of uneven contour, water tends to remain in different sections of the pipeline making it quite difficult to break the seal between pipe sections and requiring the operator to handle pipes containing water. Obviously, the pipe sections which contain water are much heavier than empty sections and in many cases the operator is splashed with water making the uncoupling task both difficult and disagreeable.

It is, therefore, an object of this invention to provide an automatically sealing, quick-release pipe coupling.

Another object is to provide an improved automatic drain valve for a pipeline.

Another object is to provide a combined quick-release, self sealing pipe coupling and automatic drain valve capable of automatically cleaning the sealing surfaces between the pipe and coupling.

Another object is to provide a combined coupling and automatic drain valve for a portable irrigation pipeline, capable of maintaining a sealed relation between the coupled members even though the members are considerably misaligned.

Another object is to provide a combined pipe coupling and automatic drain valve which is of simple and inexpensive construction and which is capable of being easily and quickly disassembled in the field.

Another object is to provide an efficient sealing element for a combination pipe coupling and automatic drain valve.

These and other objects and advantages of the present invention will be apparent from the following description taken in connection with the following drawings, in which:

Fig. 1 is a longitudinal section of the combination pipe coupling and automatic drain valve of the present invention shown with the sealing element in an unsealed position on the pipe.

Fig. 2 is a perspective, partly broken away, of the sealing element of the present invention.

The pipe coupling 4 (Fig. 1) of the present invention is of the type commonly used in portable irrigation systems to connect adjacent sections 6 and 7 of lightweight pipe. The coupling 4 comprises an annular housing 8, having an aperture 9 at one end to removably receive the end portion of the pipe 6, and a tubular skirt 10 extending from the other end thereof. The skirt may be permanently secured to the other pipe 7, as by a conventional clamping collar 11. The housing 8 comprises a cylindrical portion 12 which is integral with an end wall 13 within which the aforementioned aperture 9 is provided. A second end wall 14 of the housing 8 has a central apertured portion 15 which is of considerably larger internal diameter than the pipe 6 and is connected to the skirt 10 as an integral part thereof. The walls 13 and 14 open inwardly to form, in cooperation with the cylindrical portion 12, a widening, inwardly extending annular channel 16 within which is housed an annular sealing element 17 of a suitably resilient and flexible material, such as rubber. It can be seen that a substantial degree of misalignment between the pipe 6 and the longitudinal axis of the coupler housing 8 will be possible since the interior of the housing affords ample space to accommodate the end of the pipe 6 when the axis of the pipe is out of alignment with the axis of the coupling. The present invention provides a sealing element 17 capable of conforming to this substantial degree of misalignment between the coupler housing 8 and the pipe 6 and capable of providing a fluid tight seal between the housing and the pipe when the members are misaligned. Thus, the pipes of the portable irrigation system may be laid over surfaces of uneven contour and be bent around obstructions on the ground.

The sealing element 17 (Figs. 1 and 2) is substantially U-shaped in cross section and comprises an inner annular leg 18, an outer annular leg 19, and a bight section 21. A V-shaped annular rib 22 is provided on the bight section 21 and is positioned in contacting engagement against the inner surface of the wall 13 of the housing 8. The free end of the outer annular leg 19 is inwardly bent and has a relatively thin cross-section, as clearly shown in Fig. 1, so that it can be deflected easily to accommodate itself to irregularities on the inner surface of the housing whereby to provide an efficient seal. An annular cavity 23 is formed between the adjacent surfaces of the inner leg 18, the bight section 21 and the outer leg 19. The inner surface 24 of the inner leg 18 is of a frusto-conical configuration, defining an annular chamber 25 between the surface 24 and the periphery of the pipe 6. The smaller diameter of the inner surface 24 is formed adjacent the open end of the inner leg 18 and normally rests in light contact upon the pipe 6. This open end of the inner leg 18 is formed as a lip 26 having an annular series of drain notches or slots 27 provided therein, each slot being arranged to extend longitudinally with respect to the pipe 6. When the sealing element 17 is in a non-stressed condition, as in Fig. 1, the frusto-conical configuration of the inner surface 24 of the sealing element 17 is of such an angularity relative to the pipe 6 that the rear portions 28 of the drain slots 27 are spaced from the pipe 6. Thus, the present invention provides a sealing element 17 which, when not stressed by the pressure of water in the line, is held open due to the resilience of the element 17, allowing water to drain through the slots 27 from each of the many pipe sections used in a portable irrigation system. When the portable irrigation system is to be moved to a new location, this self-draining feature enables the operator to easily withdraw the substantially empty pipe 6 from the coupling 4 and to handle light, empty pipes rather than heavy pipes filled with water.

In the operation of connecting two pipes by means of the coupling 4 of the present invention, the pipe 6 is slid through the aperture 9 of the annular housing 8 and is positioned therein as shown in Fig. 1, thus simply and easily connecting two pipes 6 and 7 of a pipeline. Then, when water under high pressure is pumped into the pipeline and enters the cavity 23, provided in the resilient sealing element 17, pressure is exerted on all walls of the cavity. In the rather long pipe lines normally used, pressure will slowly increase at each coupling 4 so that a certain portion of the water will flow through the drain slots 27 and will wash away any mud or grass which may be present on the end of the pipe 6. As the water pressure continues to build up in the cavity 23, the entire resilient sealing element 17 shifts position. The frustoconical inner surface 24 of the inner leg 18 is deflected into sealing contact against the now clean outer surface of the pipe 6, thus preventing escape of water therebetween. The bight section 21 of the sealing element 17 is forced against the wall 13 of the channel 16 causing the annular rib 22 to be firmly pressed against the wall 13. Should minor irregularities, such as those normally occurring in castings, be present on the inner surface of the wall 13, the annular rib 22 will follow the contour of the irregularities while maintaining close contact with the wall, thus preventing water from passing between the wall 13 and the bight section 21. The outer leg 19 is forced against the cylindrical portion 12 and a portion of the wall 14 thereby providing an additional sealing engagement which, with the aid of the annular rib 22, prevents water from draining between the sealing element 17 and the annular housing 8. Thus, the sealing element 17 of this invention is actuated by the pressure of the water to form a sealed coupling between two pipes 6 and 7.

When substantially all the water pressure is released from within the irrigation system, the resiliency of the sealing element 17 causes the element 17 to release its firm sealing contact upon the pipe 6 and to assume an unstressed position as shown in Fig. 1. The water remaining in the pipe 7 then drains through the open slots 27 allowing an operator to easily and quickly slide the empty pipe 6 from within the unsealed gasket and the annular housing 8.

While the form of the device herein described constitutes one embodiment of the invention, it is to be understood that the invention is not limited to this precise form, and that changes may be made therein without departing from the scope of the invention which is defined in the appended claims.

Having thus described the invention, what I claim as new and desire to protect by Letters Patent is:

1. A coupling for joining pipes of an irrigation system comprising a housing having an apertured wall, a pipe loosely received in said apertured wall, said housing having an annular channel surrounding said pipe and facing radially inwardly toward the outer surface of the pipe, and a resilient sealing element positioned within said annular channel and including a portion having a surface arranged to be flexed into engagement with the pipe received in the housing to establish a seal therebetween, said resilient sealing element being provided with an opening in said surface of said sealing portion communicating the interior of the housing with the exterior thereof when said sealing element is in an unflexed condition.

2. A combined pipe coupling and automatic drain valve comprising a housing having an apertured wall, a pipe loosely received in said apertured wall, said housing having an enlarged annular channel section adjacent one end thereof, and a resilient ring of U-shaped cross-section positioned within said annular channel and extending around said pipe, said resilient ring having a drain opening in a surface thereof which is arranged to be deflected into sealed contact between said pipe and said housing by the pressure of liquid within the annular space between the legs of said U-shaped ring, said ring having a resiliency such that upon release of liquid pressure within said annular space said surface of said U-shaped ring moves out of sealed engagement and opens said drain opening allowing liquid to drain therefrom.

3. A combined pipe coupling and automatic drain valve comprising a housing having an apertured wall, a pipe loosely received in said apertured wall, said housing having an enlarged annular channel section adjacent one end thereof, a resilient annular element of U-shaped cross-section positioned within said annular channel and having an inner annular leg disposed around said pipe closely adjacent the surface thereof, and means defining a plurality of drain slots in the free end of said annular leg, said element being deflectable by liquid pressure within said U-shaped element into sealed contact with said pipe and said housing and having a resiliency such that upon release of liquid pressure said inner leg is moved away from said pipe allowing liquid to drain from the interior of said U-shaped element through the slots provided in the inner leg.

4. A combined automatic drain valve and pipe coupling comprising a housing having an apertured wall, a pipe loosely received in said apertured wall, said housing having a portion thereof in the form of an annular channel facing radially inward toward said pipe, a resilient annular element of U-shaped cross-section disposed in said housing and around said pipe and having an inner annular leg normally spaced from said pipe throughout a substantial portion of the length of said leg, and means defining a plurality of recesses in the edge of said inner annular leg, said element being arranged to be deflected by liquid pressure into sealed contact with said pipe and said housing, the resiliency of said element being such that upon a substantial release of liquid pressure said inner leg is retracted from said pipe allowing liquid to drain through the recesses provided therein.

5. A combined automatic drain valve and pipe coupling comprising a housing having an apertured wall, a pipe loosely received in said apertured wall, said housing having a portion thereof in the form of an annular channel facing radially inwardly toward said pipe, an annular element of U-shaped cross-section positioned within said annular channel and around the pipe received in the housing, said element having an outer annular leg of resilient material disposed in said channel and arranged to be forced into sealed engagement with said annular channel, and an inner leg of resilient material disposed adjacent said pipe and having a frusto-conical inner surface normally disposed in spaced relation to the pipe throughout a major portion of its length, and means defining a plurality of slots in said major portion, said inner leg being constructed and arranged to be deflected along substantially its entire axial length into a sealed position around said pipe when a substantial fluid pressure is exerted thereupon and to be resiliently returned to its normal spaced relation with said pipe when said pressure is reduced thereby raising said slots from the pipe allowing liquid to drain therefrom.

6. A combined automatic drain valve and pipe coupling for an irrigation system comprising a housing having an apertured wall, a pipe loosely received in said apertured wall, said housing having a portion thereof in the form of an annular channel facing radially inwardly toward said pipe, a resilient annular element of U-shaped cross-section positioned within said annular channel and around said pipe, means defining an annular rib on the exterior surface of the bight portion of said U-shaped element arranged to engage a wall of said channel, said element having an outer annular leg disposed in said channel with a thin inwardly extending lip on the free end thereof and arranged to be forced into sealed engagement against said housing and to conform to minor irregularities therein, said element having an inner leg normally disposed in spaced relation to said pipe throughout a major portion of its length and being provided with a plurality of slots in the free end thereof, said inner leg being constructed and arranged to be deflected into a sealed position around said pipe when a substantial fluid pressure is exerted thereupon and to be resiliently returned to its normal spaced relation with said pipe when said pressure is substantially reduced thereby raising said slots from the pipe allowing liquid to drain through said slots.

7. A sealing element for a combination pipe coupling and automatic drain valve comprising a resilient ring of substantially U-shaped cross-section and having an inner leg provided with a frusto-conical inner surface, said inner leg being formed with a plurality of spaced notches in its distal end.

8. A sealing gasket for a combined pipe joint and automatic drain valve, said gasket having a substantially U-shaped cross-section and comprising an outer annular leg having an inwardly directed lip at one end, an annular bight section projecting radially inwardly from the other end of said outer leg and being provided with an annular rib thereon, and an annular inner leg having a frusto-conical inner surface and a plurality of spaced slots in the end remote from said bight section.

9. In a combined drain valve and coupling seal for use in pipe couplings, a pipe, an annular member arranged to be disposed in a coupling in spaced relation around said pipe, an annular leg on said annular member formed of elastic material and adapted to project obliquely inwardly of said coupling from said annular member with said leg at its terminal end being disposed adjacent said pipe in the coupling, and means in said leg defining an opening through the elastic material at the terminal end of said leg, said leg being adapted to be flexed in an annular area located between said annular member and the terminal end of said leg into coupling sealing engagement with the pipe in response to fluid pressure in the coupling.

10. In a combined drain valve and coupling seal for use in pipe couplings, a pipe, an annular member arranged to be disposed in a coupling in spaced relation around said pipe, an annular leg on said annular member formed of elastic material and projecting obliquely inward of said coupling from said annular member into engagement at the terminal end of said leg with said pipe in the coupling, and means in said leg defining an opening through the elastic material adjacent the terminal end of said leg, said leg being adapted to be fixed in an annular area located between said annular member and said opening into coupling sealing engagement with said pipe received in the coupling in response to fluid pressure in the coupling.

References Cited in the file of this patent

UNITED STATES PATENTS

| | | |
|---|---|---|
| 259,682 | Gruber | June 20, 1882 |
| 471,630 | Walker | Mar. 29, 1892 |
| 2,202,459 | Link | May 28, 1940 |
| 2,278,074 | Hauf | Mar. 31, 1942 |
| 2,282,738 | Moore | May 12, 1942 |
| 2,449,735 | Wyss | Sept. 21, 1948 |
| 2,470,539 | Wyss | May 17, 1949 |
| 2,649,105 | Stout | Aug. 18, 1953 |
| 2,652,282 | Willetts | Sept. 15, 1953 |
| 2,656,820 | Becker | Oct. 27, 1953 |
| 2,677,560 | Cornelius | May 4, 1954 |
| 2,730,116 | Rickard | Jan. 10, 1956 |